United States Patent
You (10) Patent No.: US 8,396,378 B2
(45) Date of Patent: Mar. 12, 2013

(54) METHOD OF INITIALIZING INFORMATION ABOUT CONSUMABLE UNIT OF IMAGE FORMING APPARATUS, THE IMAGE FORMING APPARATUS AND HOST APPARATUS THEREOF

(75) Inventor: In-sun You, Suwon-si (KR)

(73) Assignee: Samsung Electronics Co., Ltd, Suonw-si (KR)

( * ) Notice: Subject to any disclaimer, the term of this patent is extended or adjusted under 35 U.S.C. 154(b) by 1232 days.

(21) Appl. No.: 12/198,920

(22) Filed: Aug. 27, 2008

(65) Prior Publication Data
US 2009/0064015 A1 Mar. 5, 2009

(30) Foreign Application Priority Data
Sep. 4, 2007 (KR) .................. 10-2007-0089639

(51) Int. Cl.
*G03G 15/00* (2006.01)
(52) U.S. Cl. ....................................... 399/12
(58) Field of Classification Search ........... 399/12, 399/11
See application file for complete search history.

(56) References Cited

U.S. PATENT DOCUMENTS

| 7,031,623 | B2 | 4/2006 | Haramoto | |
|---|---|---|---|---|
| 7,280,243 | B2 | 10/2007 | Kai | |
| 2004/0101320 | A1* | 5/2004 | Haramoto | 399/12 |
| 2005/0254838 | A1* | 11/2005 | Takahashi | 399/12 |
| 2006/0098993 | A1* | 5/2006 | Yang | 399/12 |
| 2008/0062211 | A1* | 3/2008 | Kamisuwa et al. | 347/5 |

FOREIGN PATENT DOCUMENTS

| CN | 1503077 | 6/2004 |
|---|---|---|
| JP | 2004139223 | 5/2004 |
| KR | 1020030087958 | 11/2003 |
| KR | 1020070053027 | 5/2007 |

OTHER PUBLICATIONS

Korean Office Action issued Dec. 26, 2011 in KR Application No. 10-2007-0089639.
Chinese Office Action issued Feb. 13, 2012 in CN Application No. 200810173760.7.

* cited by examiner

*Primary Examiner* — Walter L Lindsay, Jr.
*Assistant Examiner* — Frederick Wenderoth
(74) *Attorney, Agent, or Firm* — Stanzione & Kim, LLP (57) ABSTRACT

A method of initializing information about a consumable unit of an image forming apparatus, the method includes transmitting authentication information of the consumable unit to the outside, receiving initialization data of usage information about the consumable unit stored in the image forming apparatus, from the outside, and initializing the usage information about the consumable unit based on the received initialization data.

30 Claims, 4 Drawing Sheets

METHOD OF INITIALIZING INFORMATION ABOUT CONSUMABLE UNIT OF IMAGE FORMING APPARATUS, THE IMAGE FORMING APPARATUS AND HOST APPARATUS THEREOF

CROSS-REFERENCE TO RELATED APPLICATIONS

This application claims priority under 35 U.S.C. 119(a) from Korean Patent Application No. 10-2007-0089639, filed on Sep. 4, 2007, in the Korean Intellectual Property Office, the disclosure of which is incorporated herein in its entirety by reference.

BACKGROUND OF THE INVENTION

1. Field of the Invention

The present general inventive concept relates to a method of initializing information about a consumable unit of an image forming apparatus, the image forming apparatus and a host apparatus thereof, and more particularly, to a method of initializing information about a consumable unit of an image forming apparatus which receives initialization data from the outside, the image forming apparatus and a host apparatus thereof.

2. Description of the Related Art

An image forming apparatus forms an image on a recording medium based on printing data. The image forming apparatus includes a consumable unit such as a developing roller, a charging roller and a pickup roller which has a certain life span. If the consumable unit is used longer than the initially-designed life span, image quality is deteriorated or the image forming apparatus does not operate properly. Thus, the consumable unit should be replaced.

Some consumable units have a storage unit such as a CRUM (customer replacement unit memory) to store usage information about the consumable unit therein while others do not.

If the consumable unit does not have the storage unit therein, the usage information about the consumable unit is stored in a storage unit of the image forming apparatus. Thus, a user requests initialization of the usage information about the consumable unit to manufacturers or initializes the usage information through a driver of the image forming apparatus or by an additional user interface.

In this case, a user may input wrong information about the consumable unit by mistake. If the input information is different from the actual information, image quality may be deteriorated if the consumable unit is used longer than its original life span. Accordingly, a user may mistakenly determine that the image forming apparatus itself is malfunctioning and is deteriorating the printing quality. Also, it takes time and costs for a user to requests the initialization of the usage information about the consumable unit to the manufacturer.

SUMMARY OF THE INVENTION

The present general inventive concept provides a method of initializing information about a consumable unit of an image forming apparatus to replace a consumable unit without difficulty, the image forming apparatus and a host apparatus thereof.

The present general inventive concept also provides a method of initializing information about a consumable unit of an image forming apparatus to reduce replacement costs of a consumable unit, the image forming apparatus and a host apparatus thereof.

The present general inventive concept also provides a method of initializing information about a consumable unit of an image forming apparatus to maintain high quality images, the image forming apparatus and a host apparatus thereof.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept are achieved by providing a method of initializing information about a consumable unit of an image forming apparatus, the method comprising transmitting authentication information of the consumable unit to an external apparatus, receiving initialization data of usage information about the consumable unit stored in the image forming apparatus, from the external apparatus, and initializing the usage information about the consumable unit based on the received initialization data.

The initialization data may be encoded.

The consumable unit may not store the usage information about the consumable unit therein.

The receiving the initialization data may comprise transmitting the initialization data from a server to a host apparatus and transmitting the initialization data from the host apparatus to the image forming apparatus.

If the image forming apparatus may receive the initialization data from the host apparatus, the initialization data stored in the host apparatus is either maintained or removed.

The method may further comprise performing user authentication to initialize the usage information with the received initialization data.

The performing the user authentication may comprise generating a UI (user interface) by one of the image forming apparatus and the host apparatus to perform the user authentication.

The transmitting and receiving the authentication information and the initialization data may comprise transmitting and receiving the authentication information and the initialization data through one of wired and wireless communications.

The initializing the usage information may comprise initializing the usage information when the consumable unit is replaced.

The foregoing and/or other aspects and utilities of the present general inventive concept may also be achieved by providing an image forming apparatus which has a consumable unit, the image forming apparatus comprising a communication unit to transmit and receive information to initialize the consumable unit a storage unit to store information about the consumable unit therein and a controller to receive initialization data of the usage information about the consumable unit stored in the storage unit from an external apparatus after authentication information of the consumable unit is transmitted, and to initialize the usage information about the consumable unit based on the received initialization data.

The consumable unit may not store therein the usage information of the consumable unit.

The communication unit may receive the initialization data from a host apparatus.

The controller may control to initialize the usage information by the received initialization data through a user authentication.

The image forming apparatus may further comprise a UI unit which generates a UI to perform the user authentication.

The communication unit may transmit and receive the information through one of wired and wireless communications.

The controller may initialize the usage information about the consumable unit if the consumable unit is replaced.

The foregoing and/or other aspects and utilities of the present general inventive concept may also be achieved by providing a host apparatus, comprising a communication unit to transmit and receive information to initialize a consumable unit to form an image and a controller to transmit authentication information of the consumable unit to an external apparatus through the communication unit to transmit initialization data of usage information about the consumable unit from the outside to an image forming apparatus.

The host apparatus may further comprise a storage unit, wherein the controller stores the initialization data transmitted through the communication unit in the storage unit, and transmits the stored initialization data to the image forming apparatus.

The stored initialization data may be maintained or removed after transmitted to the image forming apparatus.

The host apparatus may further comprise a UI generator to initialize the usage information through user authentication.

The communication unit may transmit and receives the information through one of wired and wireless communications.

The foregoing and/or other aspects and utilities of the present general inventive concept may also be achieved by providing an image forming system including an information authenticating apparatus and a consumable unit, comprising a user input unit to allow a user to input authentication information corresponding to the consumable unit into the information authenticating apparatus, a storage unit to store usage information corresponding to the consumable unit therein, and a controller to receive initialization information from the information authenticating apparatus and to initialize the usage information stored in the storage unit.

The controller may further comprise a plurality of counters to decrement the initialized usage information.

The image forming system may further comprise an alert unit to alert the user when the consumable unit requires replacement.

The alert unit may alert the user when at least one of the initialized usage information is decremented to zero.

A first counter may decrement one of the initialized usage information each time a printing medium is fed through the image forming system, and a second counter may decrement another one of the initialized usage information based on time corresponding to a maximum usage life-span of the consumable unit.

The information authenticating apparatus may be a server or a host apparatus.

The image forming system may further comprise a user interface generator to generate a user interface based on the input authentication information of the consumable unit, and a display unit to display the user interface.

The foregoing and/or other aspects and utilities of the present general inventive concept may also be achieved by providing an image forming apparatus including a consumable unit to form an image on a printing medium, comprising a communication unit to send authentication information corresponding to the consumable unit to an external apparatus and to receive initialization information corresponding to the consumable unit from the external apparatus, a storage unit to store usage information corresponding to the consumable unit, and a controller to initialize the usage information based on the received initialization information.

The controller may further comprise a plurality of counters to decrement the initialized usage information.

The image forming apparatus may further comprise an alert unit to alert the user when the consumable unit requires replacement based on a signal received from the controller which is sent to the alert unit when at least one of the initialized usage information is decremented to zero.

A first counter may decrement one of the initialized usage information each time a printing medium is fed through the image forming system, and a second counter may decrement another one of the initialized usage information based on time corresponding to a maximum usage life-span of the consumable unit.

The image forming apparatus may further comprise a user input unit to allow a user to input authentication information corresponding to the consumable unit into the external apparatus, a user interface generator to generate a user interface based on the input authentication information of the consumable unit, and a display unit to display the user interface.

The foregoing and/or other aspects and utilities of the present general inventive concept may also be achieved by providing a method of initializing information corresponding to a consumable unit of an image forming apparatus, the method comprising inputting authentication information corresponding to the consumable unit into an external apparatus, storing usage information corresponding to the consumable unit therein, receiving initialization information from the external apparatus, and initializing the usage information stored in the storage unit.

The method may further comprise decrementing one of the initialized usage information each time a printing medium is fed through the image forming apparatus, and decrementing another one of the initialized usage information based on time corresponding to a maximum usage life-span of the consumable unit.

The method may further comprise alerting a user when the consumable unit requires replacement when at least one of the initialized usage information is decremented to zero.

BRIEF DESCRIPTION OF THE DRAWINGS

The above and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Hereinafter, exemplary embodiments of the present general inventive concept will be described with reference to accompanying drawings, wherein like numerals refer to like elements and repetitive descriptions will be avoided as necessary.

Figure 1:
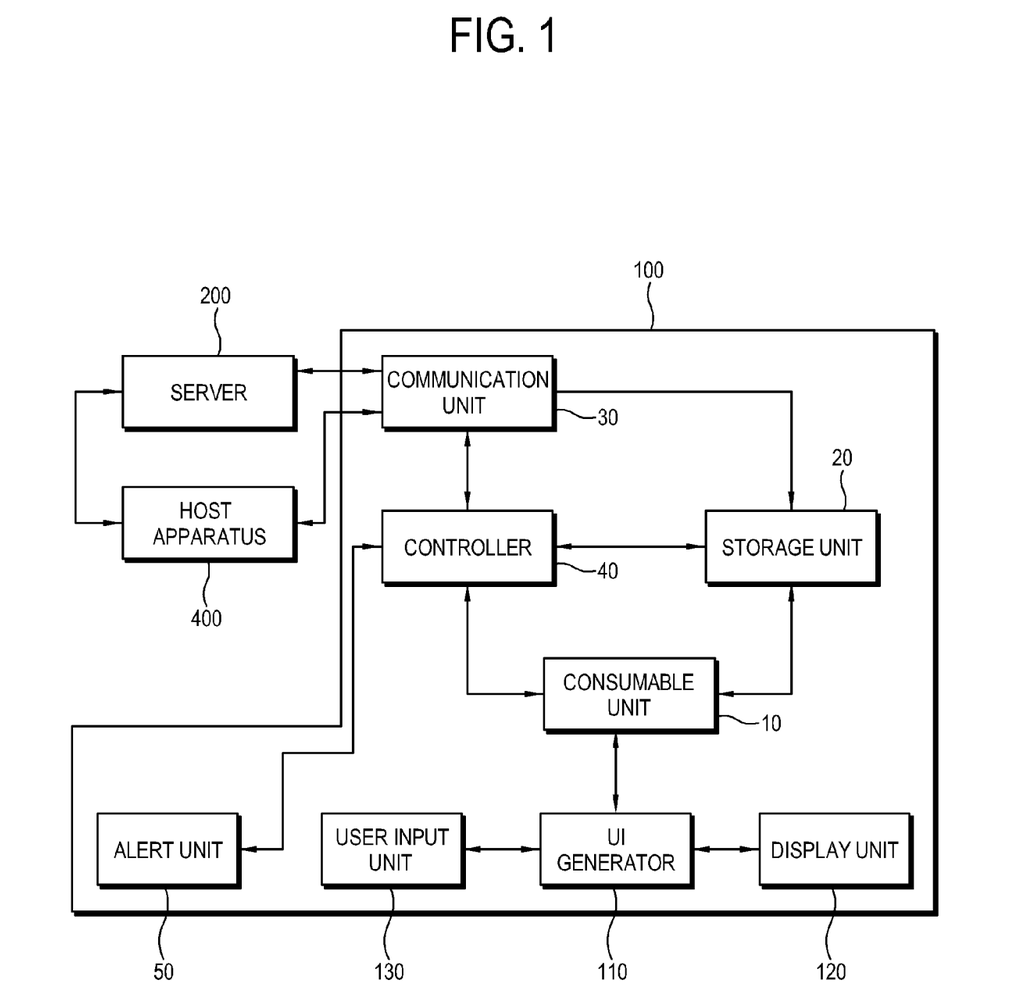
FIG. 1 is a block diagram of an image forming apparatus according to an embodiment of the present general inventive concept.

FIG. 1 is a block diagram of an image forming apparatus according to an embodiment of the present general inventive concept. As illustrated therein, an image forming apparatus 100 according to an embodiment of the present general inventive concept includes a consumable unit 10, a storage unit 20, a communication unit 30 and a controller 40. The image forming apparatus 100 may include a printer, a photocopier, a facsimile, a scanner, a multi function peripheral, etc.

The consumable unit 10 is used to form an image on a printing medium, and is detachably attached to the image forming apparatus 100. The consumable unit 10 according to an embodiment of the present general inventive concept can be replaced from the image forming apparatus 100. The consumable unit 10 may include any one of a photosensitive body, a developing roller, a charging roller, a transfer roller, a fusing roller, a feeding roller, a pressure roller, an intermediate transfer roller and a toner cartridge, which are not illustrated. If the consumable unit 10 is used more than a predetermined usage amount, which is determined during manufacturing processes, the consumable unit 10 should be replaced.

The storage unit 20 stores usage information about the consumable unit 10 thereby not requiring a storage unit, such as a CRUM (customer replacement unit motor), within the consumable unit 10 itself. More specifically, the storage unit 20 according to an embodiment of the present general inventive concept stores the usage information of the consumable unit 10, including identification information of a manufacturer, manufactured data, printing page count, life-span under normal use conditions, etc. The storage unit 20 may further store personalized user information corresponding to various users. The storage unit 20 according to the present general inventive concept may also include a non-volatile memory such as a flash memory.

The communication unit 30 transmits and receives information to initialize (i.e., initialization information) the consumable unit 10. More specifically, the communication unit 30 according to an embodiment of the present general inventive concept may receive the initialization information to initialize the consumable unit 10 from an external apparatus 200 such as a server, or a host apparatus 400. Then, the communication unit 30 may transmit the received initialization information to the storage unit 20. The communication unit 30 may communicate with the external apparatus 200 and the host apparatus 400 through not only a wired network using a LAN cable, but also through a wireless network such as wireless LAN and Bluetooth. If the communication unit 30 supports the wireless communication, it may include an antenna.

The communication unit 30 may include USB and IEEE 1284 parallel interfaces to receive the initialization data of the consumable unit 10 from the host apparatus 400.

Also, the communication unit 30 transmits authentication information (e.g., bar code information, serial numbers, etc.) to the external apparatus 200. A user may also transmit the authentication information through an outside terminal device such as a mobile phone or a PDA, instead of through the communication unit 30. Both the external apparatus 200 and the host apparatus 400 can be characterized as information authenticating apparatuses.

If the image forming apparatus 100 according to an embodiment of the present general inventive concept receives the initialization data of the consumable unit 10 directly from the external apparatus 200, the communication unit 30 has a preset IP address to be identified.

After the communication unit 30 transmits the authentication information of the consumable unit 10 to the external apparatus 200, the controller 40 receives the initialization data of the usage information about the consumable unit 10 stored in the storage unit 20 from the external apparatus 200, and initializes the usage information stored in the storage unit 20 based on the initialization data received when the consumable unit 10 is replaced.

Figure 4:
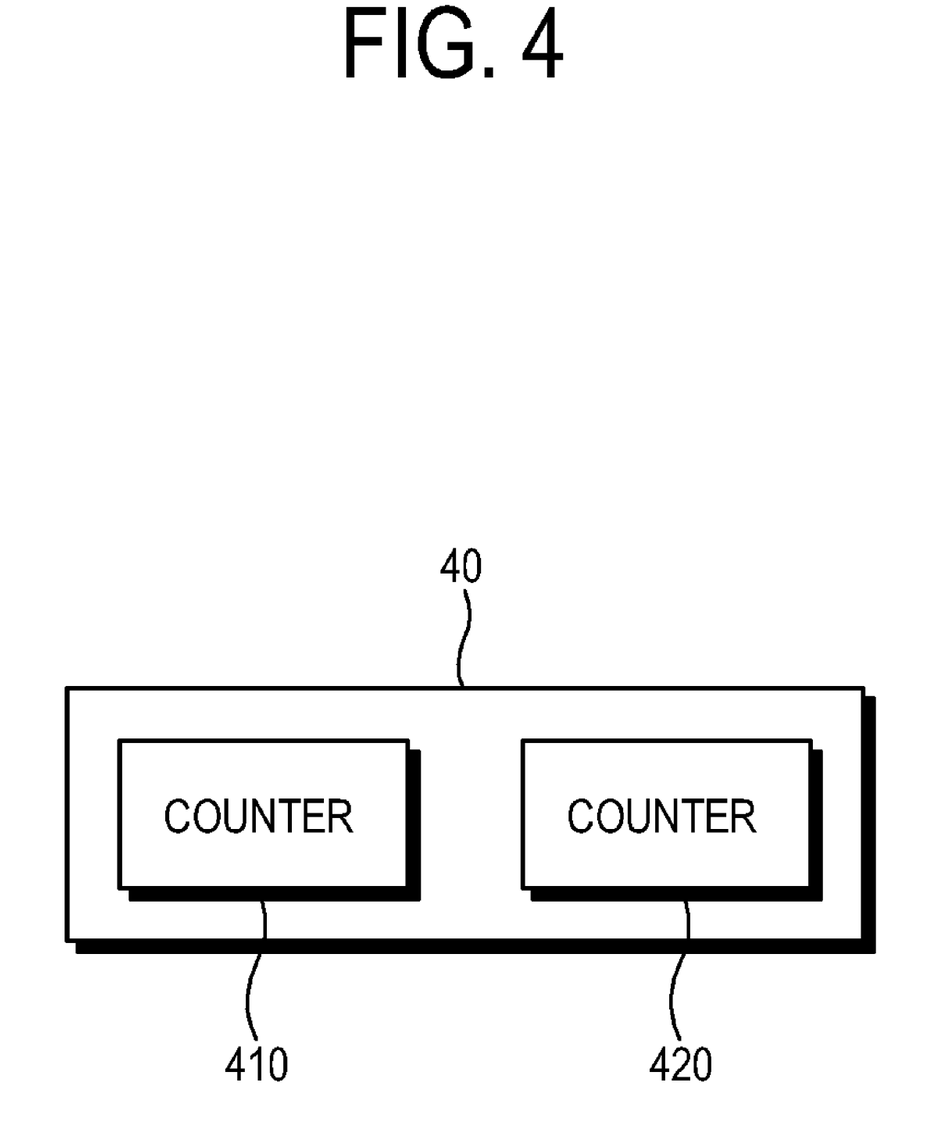
FIG. 4 is a block diagram of a controller including two counters according to another exemplary embodiment of the present general inventive concept.

Referring to FIG. 4, the controller may include counters 410 and 420. Also, the usage information stored in the storage unit 20 may be in the form of variables X and Y to be initialized (i.e., set) based on the initialization data received when the consumable unit 10 is replaced. For example, variable X can correspond to a maximum number of printing media and variable Y can correspond to a maximum life span (in units of time) of the consumable unit 10. Therefore, if the received initialization data denotes that the consumable unit 10 has a life span of 5,000 sheets, then the controller 40 can initialize variable X to be 5,000 and the counter 410 will decrement X each time a printing medium is printed upon until variable X decrements to zero (0). Likewise, if the received initialization data denotes that the consumable unit 10 has a life span of 4 months, the counter 420 is set to 4 months and decrements like a clock. Once either the counter 410 or 420 decrements to zero, the controller 40 sends a signal to alert unit 50 to alert a user that the consumable unit 10 requires replacement. The alert unit 50 may include any type of visual, audio, or tactile alert system to alert the user that the consumable unit 10 requires replacement.

The usage information stored in the storage unit 20 may be initialized to any number desired by the user, so the counters 410 and 420 can also be incrementers. Accordingly, the consumable unit 10 would require replacement when a maximum value (instead of zero) is reached.

The authentication information is included in the consumable unit 10. Since the consumable unit 10 according to an embodiment of the present general inventive concept does not have an additional storage unit, the authentication information is attached to an external surface of the consumable unit 10 or supplied additionally on a separate sheet of paper, disc, etc., when the consumable unit 10 is purchased.

The authentication information may be transmitted to the external apparatus 200 through the host apparatus 400. Alternatively, the authentication information may be directly input to the image forming apparatus 100 to be transmitted to the external apparatus 200 if the image forming apparatus 100 can access the external apparatus 200.

If the controller 40 transmits the authentication information to the external apparatus 200 through the communication unit 30, the external apparatus 200 transmits the initialization data to the image forming apparatus 100 to initialize the stored usage information about the consumable unit 10 corresponding to the received authentication information.

The initialization data includes a command file to initialize the usage information about the consumable unit 10. The command file which is transmitted to the image forming apparatus 100 may be encoded not to be used by another image forming apparatus 100.

Figure 2:
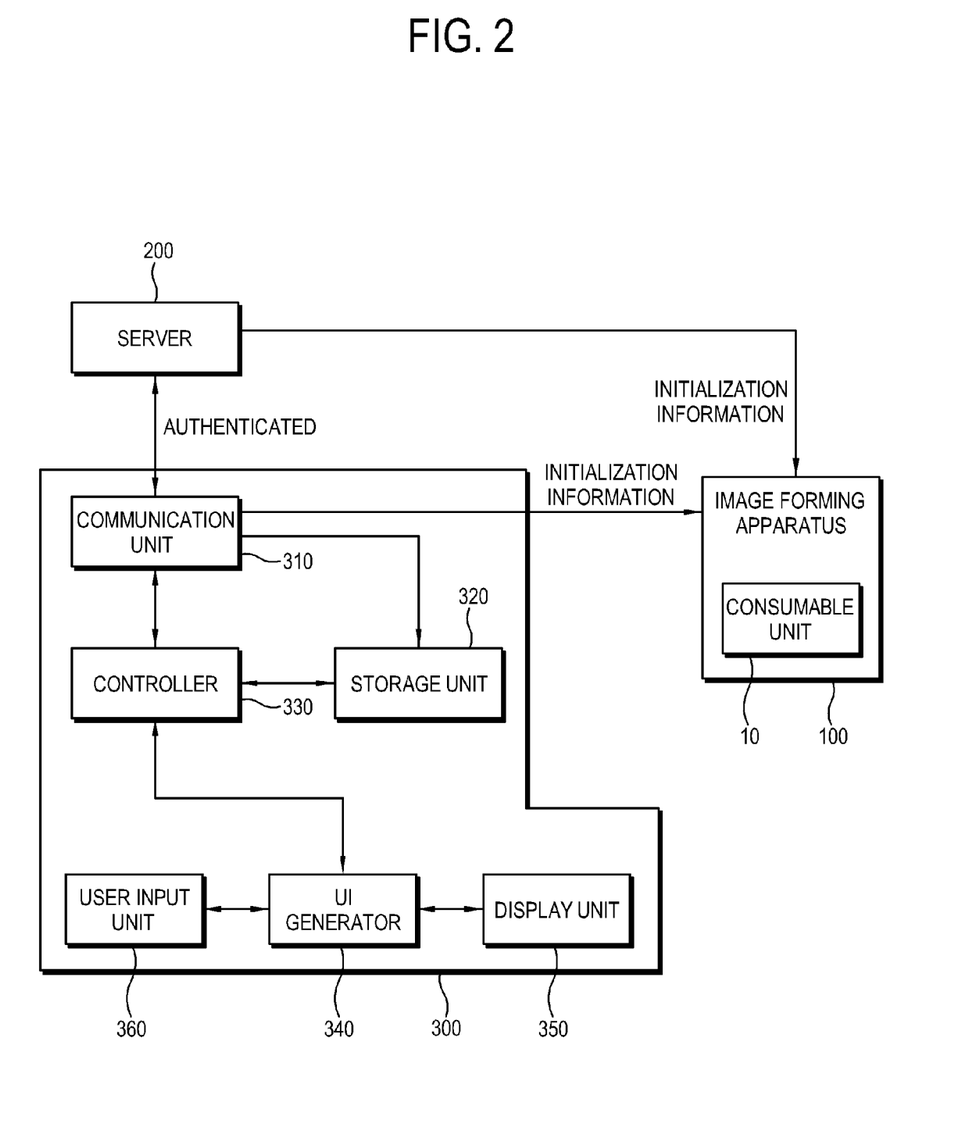
FIG. 2 is a block diagram of an image forming apparatus according to another exemplary embodiment of the present general inventive concept.

FIG. 2 illustrates an image forming apparatus 100 according to another exemplary embodiment of the present general inventive concept. As described according to the exemplary embodiment with reference to FIG. 1, the external apparatus 200 may directly transmit the initialization data to the image forming apparatus 100. Alternatively, as illustrated in FIG. 2, the external apparatus 200 may transmit the initialization data to a host apparatus 300, and the host apparatus 300 may transmit the received initialization data to the image forming apparatus 100.

If a user inputs the authentication information about the consumable unit 10 through the host apparatus 300 to be transmitted to the external apparatus 200, the external apparatus 200 transmits the initialization data to the host apparatus 300 corresponding to the received authentication information.

Accordingly, a user may not change the initialization data from the host apparatus 300, and only receives the initialization data from the image forming apparatus 100. If the initialization data is transmitted from the host apparatus 300 to the image forming apparatus 100, the host apparatus 300 may remove the stored initialization data therefrom.

Thus, the initialization data to initialize the usage information about the consumable unit 10 may neither be changed by a user nor reused by another image forming apparatus 100.

If the initialization data is received through the communication unit 30 to initialize the usage information about the consumable unit 10, the controller 40 initializes the usage information about the consumable unit 10 stored in the storage unit 20, based on the received initialization data. Then, if the consumable unit 10 does not have an additional storage unit to store the usage information thereabout, the consumable unit 10 is authenticated through the network to thereby facilitate replacement thereof.

The image forming apparatus 100 according to an embodiment of the present general inventive concept may include a UI (user interface) generator 110, a display unit 120 and a user input unit 130. Thus, a user may directly initialize the usage information about the consumable units from the image forming apparatus 100.

If the image forming apparatus 100 according to the present general inventive concept does not support a network function to access the external apparatus 200, the usage information about the consumable unit 10 may be initialized by user authentication. According to an exemplary embodiment of the present general inventive concept, a user may photograph bar code information attached on the consumable unit 10 with a terminal such as a mobile phone or a PDA (personal digital assistant), transmit the photographed image to the external apparatus 200 and initialize the usage information about the consumable unit 10 through a UI of the image forming apparatus 100 by using passwords transmitted from the external apparatus 200. In this case, one of the image forming apparatus 100 and the host apparatus 300 may generate a UI to authenticate a user, i.e. a UI to initialize the usage information, and display the generated UI.

As illustrated in FIG. 2, the host apparatus 300 according to an embodiment of the present general inventive concept includes a communication unit 310, a storage unit 320 and a controller 330. The host apparatus 300 according to an embodiment of the present general inventive concept may include a PC which is connected with the image forming apparatus 100.

The communication unit 310 transmits and receives information to initialize the consumable unit 10 to thereby form an image. More specifically, the communication unit 310 transmits the authentication information about the consumable unit 10 to the external apparatus 200. The communication unit 310 according to an embodiment of the present general inventive concept may communicate through not only a wired network such as a LAN cable, but also through a wireless network such as wireless LAN and Bluetooth, like the communication unit 10 of the image forming apparatus 100 does. If the communication unit 310 communicates through the wireless network, it may have an antenna. The communication unit 310 may have USB and IEEE 1284 parallel interfaces to receive the initialization data from the host apparatus 300.

The storage unit 320 stores the initialization data received through the communication unit 310. The storage unit 320 according to an embodiment of the present general inventive concept may include not only a non-volatile memory such as a flash memory, but also a large-capacity storage medium such as a hard disk.

The storage unit 320 according to an embodiment of the present general inventive concept may be removed if the initialization data is directly transmitted from the external apparatus 200 to the image forming apparatus 100.

The controller 330 transmits the authentication information of the consumable unit 10 to the external apparatus 200 through the communication unit 310. Then, the external apparatus 200 receives the authentication information from the host apparatus 300 and transmits the initialization data to the image forming apparatus 100 to initialize the usage information about the consumable unit 10.

The controller 330 of the host apparatus 300 according to an embodiment of the present general inventive concept may control the communication unit 310 to receive the initialization data directly from the external apparatus 200. Then, the controller 330 may store the received initialization data in the storage unit 320 and transmit the stored initialization data to the image forming apparatus 100. Even if the image forming apparatus 100 does not have a network function to access the external apparatus 200, the initialization data may be transmitted to the image forming apparatus 100 to initialize the usage information corresponding to the consumable unit 10.

The host apparatus 300 according to an embodiment of the present general inventive concept may include a UI (user interface) generator 340, a display unit 350 and a user input unit 360. The host apparatus 300 may receive a user's input to transmit the authentication information and the initialization data to the external apparatus 200 and the image forming apparatus 100, respectively.

Figure 3:
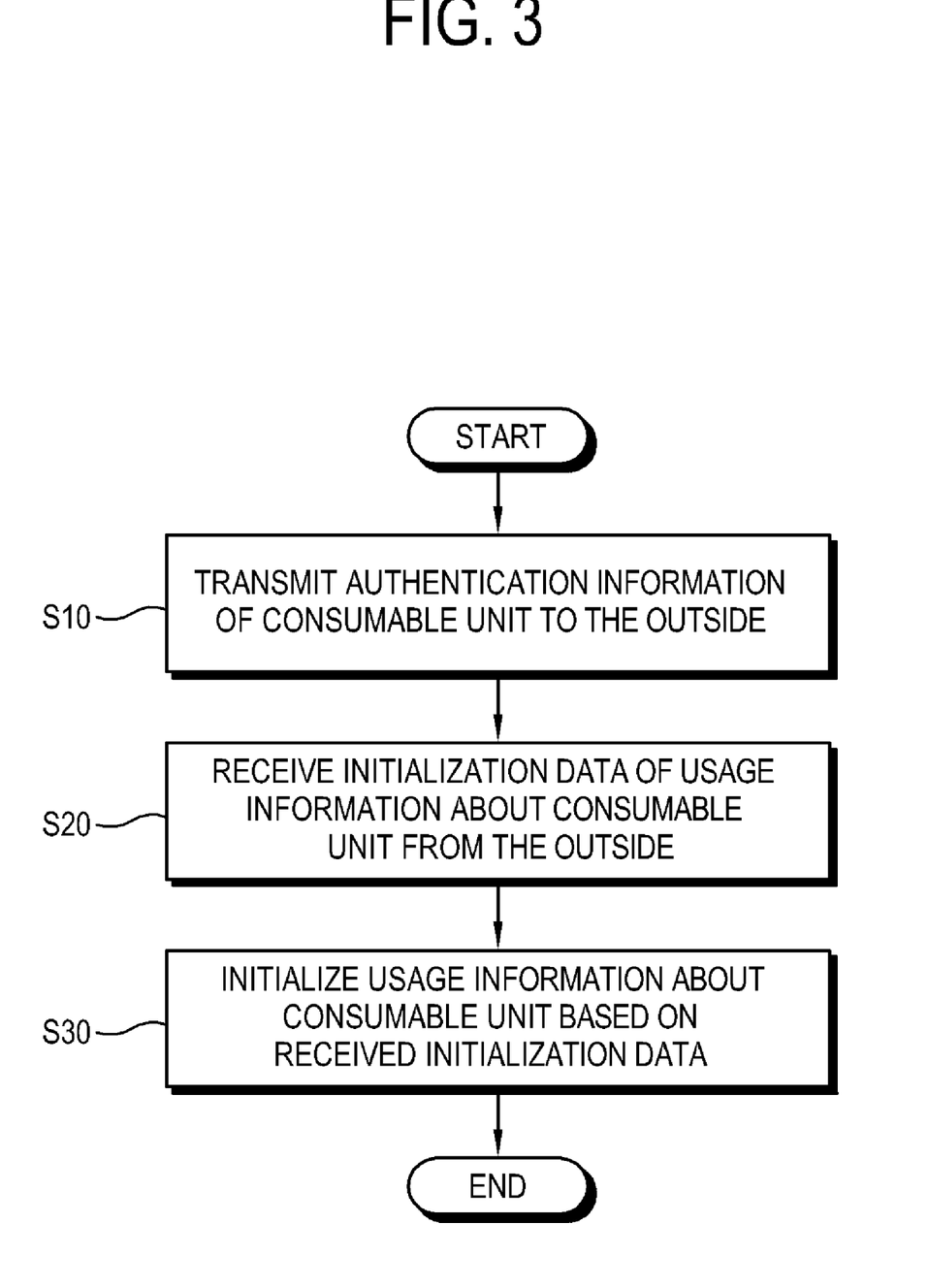
FIG. 3 is a flowchart to describe a method of initializing information about a consumable unit of the image forming apparatus according to an embodiment of the present general inventive concept.

Hereinafter, a method of initializing the information about the consumable goods of the image forming apparatus 100 according to an embodiment of the present general inventive concept will be described with reference to FIG. 3.

In operation S10, the authentication information about the consumable unit 10 used to form an image is transmitted to the external apparatus 200. The authentication information may be transmitted not only from the host apparatus 300 but also from the image forming apparatus 100. If the authentication information includes the bar code information of the consumable unit 10, a user may directly transmit the authentication information to the external apparatus 200 with a mobile phone or a PDA.

In operation S20, the image forming apparatus 100 receives the initialization data of the usage information about the consumable unit 10 stored in the image forming apparatus 100, from the external apparatus 200. At operation S20, the initialization data may be transmitted to the host apparatus 300 as well as to the image forming apparatus 100.

The controller 40 initializes the usage information about the consumable unit 10 based on the received initialization data in operation S30.

If the authentication information includes the bar code information attached to the consumable unit 10, the usage information about the consumable unit 10 may be initialized by the initialization data received at operation S20 through user authentication of the consumable unit 10. Operation S30 may further include an operation of generating a UI to perform user authentication of the consumable unit 10 via one of the image forming apparatus 100 and the host apparatus 300, and displaying the generated UI.

Thus, a user may replace the consumable unit 10 without difficulty, and reduce replacement costs.

As described above, the present general inventive concept provides a method of initializing information about a consumable unit of an image forming apparatus to know when to replace a consumable unit, the image forming apparatus and a host apparatus thereof.

Also, the present general inventive concept provides a method of initializing information about a consumable unit of an image forming apparatus which reduces replacement costs of a consumable unit, the image forming apparatus and a host apparatus thereof.

Further, the present general inventive concept provides a method of initializing information about a consumable unit of an image forming apparatus which maintains high quality images, the image forming apparatus and a host apparatus thereof.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A method of initializing information corresponding to a consumable unit of an image forming apparatus, the method comprising:
    transmitting authentication information of the consumable unit to an external apparatus;
    receiving initialization data of usage information corresponding to the consumable unit stored in the image forming apparatus, from the external apparatus; and
    initializing the usage information about the consumable unit based on the received initialization data.

2. The method according to claim 1, wherein the initialization data is encoded.

3. The method according to claim 1, wherein the consumable unit does not store the usage information about the consumable unit therein.

4. The method according to claim 1, wherein the receiving the initialization data comprises:
    transmitting the initialization data from a server to a host apparatus; and
    transmitting the initialization data from the host apparatus to the image forming apparatus.

5. The method according to claim 4, wherein if the image forming apparatus receives the initialization data from the host apparatus, the initialization data stored in the host apparatus is either maintained or removed.

6. The method according to claim 1, further comprising:
    performing user authentication to initialize the usage information with the received initialization data.

7. The method according to claim 6, wherein the performing the user authentication comprises:
    generating a UI (user interface) by one of the image forming apparatus and the host apparatus to perform the user authentication.

8. The method according to claim 1, wherein the transmitting and receiving the authentication information and the initialization data comprises:
    transmitting and receiving the authentication information and the initialization data through one of wired and wireless communications.

9. The method according to claim 1, wherein the initializing the usage information comprises:
    initializing the usage information when the consumable unit is replaced.

10. An image forming apparatus which has a consumable unit, the image forming apparatus comprising:
    a communication unit to transmit and receive information to initialize the consumable unit;
    a storage unit to store usage information about the consumable unit therein; and
    a controller to receive initialization data of the usage information about the consumable unit stored in the storage unit from an external apparatus after authentication information of the consumable unit is transmitted, and initialize the usage information about the consumable unit based on the received initialization data.

11. The image forming apparatus according to claim 10, wherein the consumable unit does not store therein the usage information of the consumable unit.

12. The image forming apparatus according to claim 10, wherein the communication unit receives the initialization data from a host apparatus.

13. The image forming apparatus according to claim 10, wherein the controller controls to initialize the usage information by the received initialization data through a user authentication.

14. The image forming apparatus according to claim 13, further comprising a UI (user interface) unit to generate a UI to perform the user authentication.

15. The image forming apparatus according to claim 10, wherein the communication unit transmits and receives the information through one of wired and wireless communications.

16. The image forming apparatus according to claim 10, wherein the controller initializes the usage information about the consumable unit if the consumable unit is replaced.

17. A host apparatus, comprising:
    a communication unit to transmit and receive information to initialize a consumable unit forming an image; and
    a controller to transmit authentication information of the consumable unit to an external apparatus through the communication unit to transmit initialization data of usage information about the consumable unit from the external apparatus to an image forming apparatus.

18. The host apparatus according to claim 17, further comprising:
    a storage unit, wherein
    the controller stores the initialization data transmitted through the communication unit in the storage unit, and transmits the stored initialization data to the image forming apparatus.

19. The host apparatus according to claim 18, wherein the stored initialization data is maintained or removed after being transmitted to the image forming apparatus.

20. The host apparatus according to claim 17, further comprising:
    a UI generator to initialize the usage information through user authentication.

21. The host apparatus according to claim 17, wherein the communication unit transmits and receives the information through one of wired and wireless communications.

22. An image forming system including an image forming apparatus, an information authenticating apparatus and a consumable unit, comprising:

a user input unit to allow a user to input authentication information corresponding to the consumable unit into the information authenticating apparatus;

a storage unit to store usage information corresponding to the consumable unit therein; and a controller to receive initialization information from the information authenticating apparatus and to initialize the usage information stored in the storage unit, the controller comprising a plurality of counters to decrement the initialized usage information.

23. The image forming system of claim 22, further comprising:

an alert unit to alert the user when the consumable unit requires replacement.

24. The image forming system of claim 23, wherein the alert unit alerts the user when at least one of the initialized usage information is decremented to zero.

25. The image forming system of claim 22, wherein: a first counter decrements one of the initialized usage information each time a printing medium is fed through the image forming system; and a second counter decrements another one of the initialized usage information based on time corresponding to a maximum usage life-span of the consumable unit.

26. The image forming system of claim 22, wherein the information authenticating apparatus is a server or a host apparatus.

27. The image forming system of claim 22, further comprising:

a user interface generator to generate a user interface based on the input authentication information of the consumable unit; and a display unit to display the user interface.

28. A method of initializing information corresponding to a consumable unit of an image forming apparatus, the method comprising:

inputting authentication information corresponding to the consumable unit into an external apparatus;

storing usage information corresponding to the consumable unit therein;

receiving initialization information from the external apparatus; and initializing the usage information stored in the storage unit.

29. The method of claim 28, further comprising:

decrementing one of the initialized usage information each time a printing medium is fed through the image forming apparatus; and decrementing another one of the initialized usage information based on time corresponding to a maximum usage life-span of the consumable unit.

30. The method of claim 29, further comprising:

alerting a user when the consumable unit requires replacement when at least one of the initialized usage information is decremented to zero.

* * * * *